(12) United States Patent
Eriksson et al.

(10) Patent No.: US 8,584,824 B2
(45) Date of Patent: Nov. 19, 2013

(54) METHOD AND DEVICE FOR CONTROLLING AN AUTOMATIC FREEWHEELING FUNCTION IN A VEHICLE

(75) Inventors: Anders Eriksson, Torslanda (SE); Niklas Öberg, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 203 days.

(21) Appl. No.: 13/319,338

(22) PCT Filed: May 8, 2009

(86) PCT No.: PCT/SE2009/000235
§ 371 (c)(1),
(2), (4) Date: Nov. 29, 2011

(87) PCT Pub. No.: WO2010/128898
PCT Pub. Date: Nov. 11, 2010

(65) Prior Publication Data
US 2012/0065852 A1      Mar. 15, 2012

(51) Int. Cl.
*F16D 43/00* (2006.01)

(52) U.S. Cl.
USPC ............... 192/50; 701/54; 701/93; 701/94; 701/95; 701/123; 477/96; 477/74; 477/73; 192/48.6; 180/65.27

(58) Field of Classification Search
None
See application file for complete search history.

(56) References Cited

FOREIGN PATENT DOCUMENTS

| | | |
|---|---|---|
| EP | 1923291 A2 | 5/2008 |
| GB | 2452579 A | 3/2009 |
| WO | 2005084995 A1 | 2/2005 |
| WO | 2008130288 A1 | 10/2008 |

OTHER PUBLICATIONS

International Search Report for corresponding international Application PCT/SE2009/000235.

*Primary Examiner* — Thomas Tarcza
*Assistant Examiner* — Richard Goldman
(74) *Attorney, Agent, or Firm* — WRB-IP LLP

(57) ABSTRACT

A method and device for controlling an automatic freewheeling function in a vehicle where a freewheeling function is active due to a prevailing freewheeling condition and where a control unit is programmed to:
  predict that the vehicle soon will travel in a steep downhill slope that is steeper compared to a prevailing downhill slope;
  simulate if less fuel will be consumed if the freewheeling function is inactivated in a a further position before the vehicle enters the steeper downhill slope, compared to if the vehicle enters the steeper downhill slope with the freewheeling function active; and
  inactivate the freewheeling function in the further position, that is, before the vehicle enters the steeper downhill slope if the simulation shows that less fuel will be consumed.

10 Claims, 2 Drawing Sheets

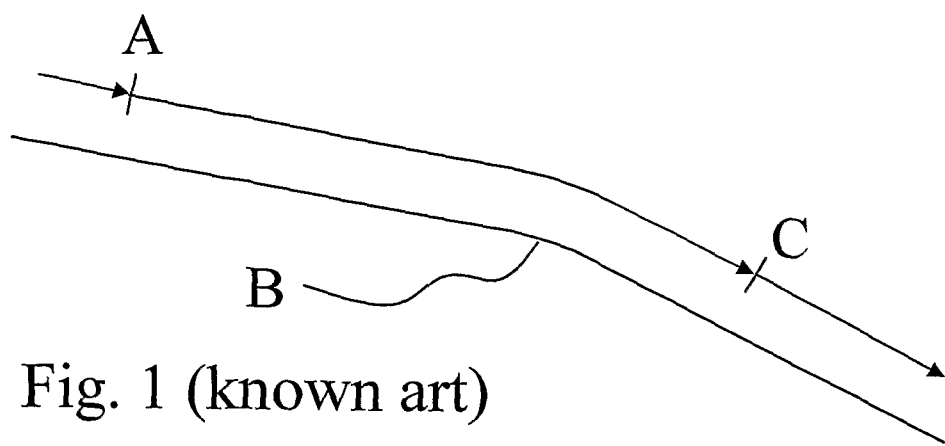
Fig. 1 (known art)
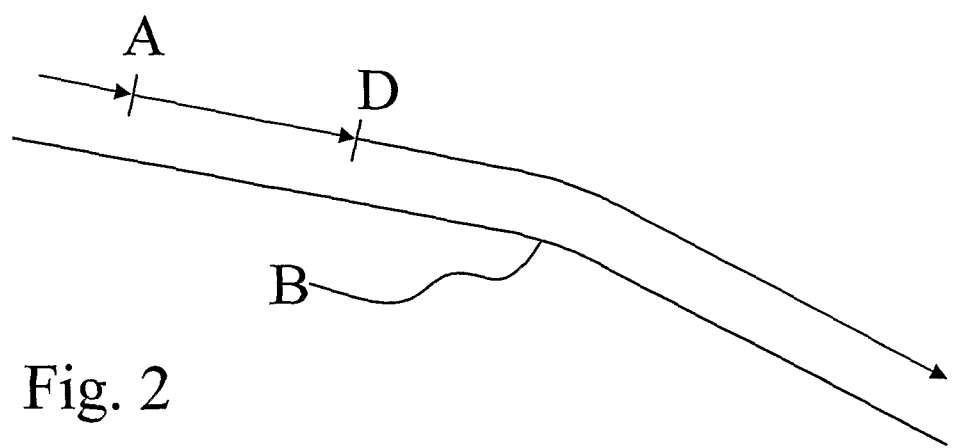
Fig. 2

METHOD AND DEVICE FOR CONTROLLING AN AUTOMATIC FREEWHEELING FUNCTION IN A VEHICLE

BACKGROUND AND SUMMARY

The present invention relates according to an aspect thereof to a method and device for controlling inactivation of a freewheeling function in a vehicle.

The present invention also relates according to further aspects thereof to a computer program, computer program product and a storage medium to be used with a computer for executing said method.

An automatic vehicle transmission designed from planetary gears usually has one-way couplings between the planetary gear steps, which, when a propulsion engine is in drive, lock in the automatic gear position for torque transmission from the engine to the drive wheels, but which, when torque is transmitted in the opposite direction, i.e. at zero throttle and with the vehicle in motion, disengage and cause the vehicle to freewheel without engine braking, which, by utilizing the kinetic energy of the vehicle, yields lower fuel consumption than if the engine is busy braking.

A corresponding freewheel function for automated mechanical transmissions (AMT) is shown in WO 2005/084995. Here, the freewheel function is automatically activated when a predetermined vehicle condition is prevailing. This condition comprises at least traveling in a not too steep downslope and that there is no fuel demand from the driver (via the accelerator pedal) or from a cruise control in the vehicle. When the freewheel function is activated with a certain vehicle set speed, i. e. during a time period when the cruise control is active, and a certain over speed limit (VBCC set speed) is exceeded, then the freewheel function is automatically inactivated and the vehicle is automatically braked to a speed under said VBCC setspeed—When vehicle speed is below VBCC setspeed the freewheel function will be activated again if the right vehicle conditions are still prevailing.

WO2005/084995 further discloses that said VBCC setspeed can be automatically adjusted in dependence of road gradient in the near future, e. g. in dependence of that the prevailing downhill slope will end in a near future, which means increased VBCC setspeed in order to postpone inactivation of the freewheel function.

FIG. 1 discloses activation and inactivation of a freewheeling function when traveling a moderate downhill which soon changes to a steeper (downwards position B) downhill. According to prior art (see FIG. 1) if vehicle travel resistance becomes less than zero (moderate downhill) said freewheeling function will be activated when the vehicle is in position A. If said moderate downhill changes to a steep downhill (position B and downwards) the vehicle will gain speed quickly and when said over speed limit (VBCC set speed) is exceeded at position C, the freewheel function will automatically be inactivated and the vehicle will be automatically braked (from position C and downwards) to a speed under said VBCC setspeed.

It is desirable to address a technical problem of how to further decrease fuel consumption in a vehicle equipped with such a freewheel functionality.

An aspect of the present invention involves inactivating said-freewheeling at the right vehicle position. This can be done by a method starting from when a freewheeling function in a vehicle is active due to a prevailing freewheeling condition. This method is according to an aspect of the invention characterized in the steps of:
predicting that said vehicle soon will travel in a steep downhill slope that is steeper compared to a prevailing downhill slope,
simulating if less fuel will be consumed if said freewheeling function is inactivated before said vehicle enters said steeper downhill slope compared to if said vehicle enters said steeper downhill slope with said freewheeling function active,
inactivating said freewheeling function before said vehicle enters said steeper downhill slope if said simulation shows that less fuel will be consumed.

In one embodiment of the invention vehicle speed is starting to decrease before entering said steeper downhill slope and when inactivating said freewheeling function. In a further embodiment said inactivation of said freewheeling function comprises drivingly connecting a combustion engine to a transmission and driven wheels of said vehicle. In an even further embodiment of the invention said decrease of vehicle speed is performed by braking the vehicle with an engine braking device and/or an auxiliary braking device.

In another embodiment of the invention said simulation can also include simulating vehicle speed change with different possible gears engaged in said transmission and selecting the one gear that results in a smallest change of vehicle speed.

The device for controlling said automatic freewheeling relates to a vehicle that comprises an engine, an automated manual transmission, by said engine driven wheels, a freewheeling device and a control unit for controlling said engine, where said engine is arranged to drive said driven wheels via said automated manual transmission, and where said freewheeling device, said engine and said automated manual transmission are controlled by a control unit, where said control unit is arranged to perform the above method steps.

BRIEF DESCRIPTION OF THE DRAWING

The present invention will be described in greater detail below with reference to the accompanying drawings which, for the purpose of exemplification, shows further preferred embodiments of the invention and also the technical background, and in which:

FIG. 1 shows a downhill and positions for activation and inactivation of a freewheeling function according to known art.

FIG. 2 shows the same downhill but with positions for activation and inactivation of a freewheeling function according to the present invention.

DETAILED DESCRIPTION

Figure 3:
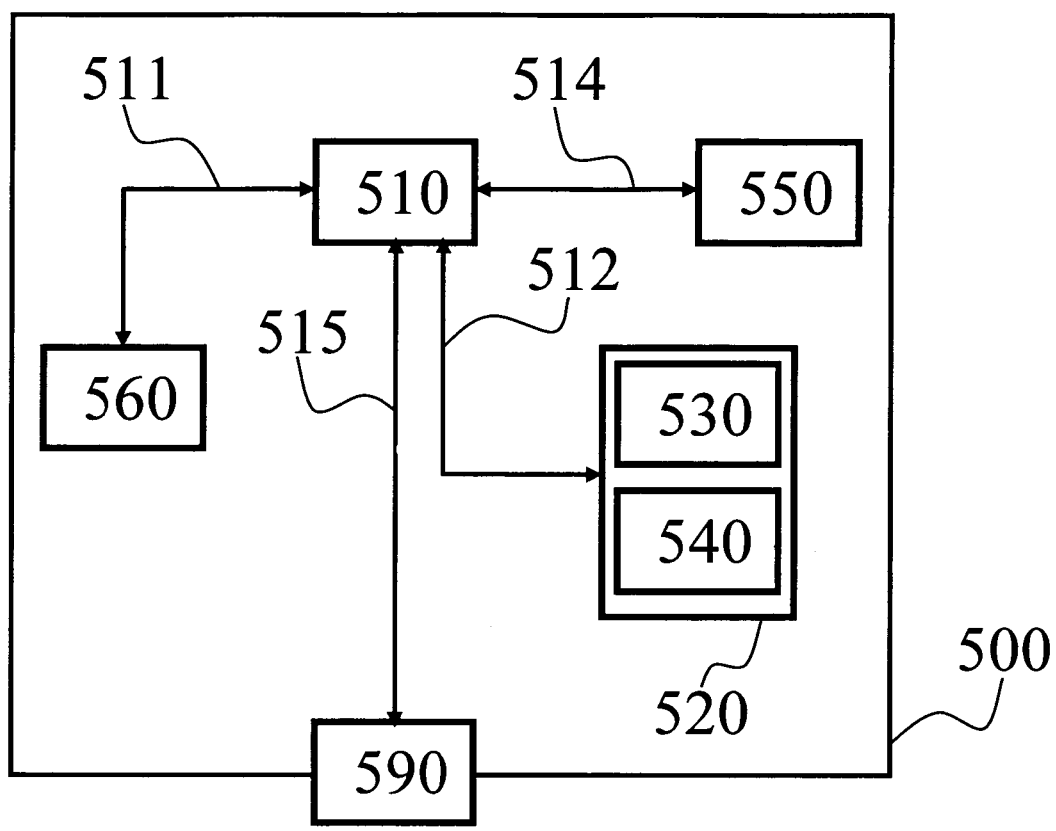
FIG. 3 shows a computer arrangement for the invention.

In one embodiment of the invention the vehicle comprises a propulsion unit with an output shaft connected to driven wheels of the vehicle via a transmission arranged for gear ratio change between said propulsion unit and said driven wheels. The propulsion unit can be a combustion engine or a hybrid unit comprising for example a combustion engine and an electric motor/generator. The transmission can be a stepped gear transmission, for example an AMT or Dual Clutch Transmission (DCT), comprising a freewheel function allowing the vehicle to freewheel during certain predetermined vehicle conditions in order to save fuel as mentioned above and as known in prior art. The propulsion unit and the transmission forms a drive train of the vehicle. The drive train preferably comprises one or several control units for controlling different functions of the drive train as known in the art. The vehicle also comprises a cruise control, which as such is known art and in which said freewheeling functionality can be integrated. The freewheel function can be used during a cruise control active period.

According to one embodiment of the invention a control unit, which can for example comprise said cruise control, is programmed to activate said freewheeling due to a prevailing freewheeling condition, for example such as when the vehicle is in position A in mentioned figure I. Thus, the vehicle starts freewheeling in position A. This freewheeling activation procedure as such is performed according to known art (described above). FIG. 2 discloses the same downhill as in FIG. 1. Said position A has the same position in the downhill in both figures. Thus, also in FIG. 2 the vehicle starts freewheeling in position A. What happens in the downhill below of said position A in FIG. 2 is according to the invention and will now be described below.

In said embodiment according to the invention and after said freewheeling function has been activated said control unit is programmed to:
  predict that said vehicle soon will travel in a steep downhill slope (that is below of position B in FIG. 2) that is steeper compared to a prevailing downhill slope;
  simulate if less fuel will be consumed if said freewheeling function is inactivated in a position D (which is positioned above of said position B) before said vehicle enters said steeper downhill slope, compared to if said vehicle enters said steeper downhill slope with said freewheeling function active;
  inactivate said freewheeling function in said position D, that is, before said vehicle enters said steeper downhill slope if said simulation shows that less fuel will be consumed.

Said prediction that the vehicle soon will travel in a steep downhill slope can be performed according to known art with information from, for example, an electronic map and a vehicle positioning system (for example Global Positioning System) or a device for route identification in combination with a vehicle positioning system.

Said simulation is performed with prevailing values for vehicle parameters, such as, vehicle speed, vehicle acceleration, vehicle gross weight, road inclination (at present and coming vehicle positions), and with parameters that can be regulated to different values during vehicle travelling, such as different freewheeling inactivation positions (for example different vehicle positions between positions A and C). Fuel consumption is calculated in every simulation. Said control unit can be programmed to select parameter values from the simulation with the lowest fuel consumption and control said freewheeling accordingly. For example if said simulations shows that the lowest fuel consumption will be achieved if said freewheeling is inactivated in position D (as in FIG. 2), said control unit will inactivate the freewheeling when the vehicle arrives at position D.

Thus, the purpose of the invention is to estimate if less fuel will be consumed if freewheeling inactivation occurs before position C and even before position B. Thus, the benefit of the invention is decreased fuel consumption and a smarter use of prevailing vehicle conditions, especially the road topography.

As described above and according to known art a freewheeling inactivation will be performed by said control unit anyway if said over speed limit (VBCC set speed) is exceeded at position C.

According to one embodiment of the invention said inactivation of said freewheeling function comprises that said control unit is programmed to drivingly connect a combustion engine of the vehicle to a transmission and driven wheels of said vehicle. This can be performed according to known art.

According to a further embodiment of the invention said control unit can be programmed also to start decrease vehicle speed before entering said steeper downhill slope and after said freewheeling has been inactivated. This means that said control unit can be programmed to initiate a braking torque somewhere between positions D and B with service brakes and/or with an auxiliary braking arrangement, where one or both can be arranged in said vehicle. The position of the braking torque initiation, amount of braking torque and regulation of said braking torque during vehicle travelling can be simulated in order to achieve, for example, a predetermined vehicle speed at a position further ahead on the road. Said braking torque can be achieved with engine braking device and/or service brakes and/or with an auxiliary braking arrangement, where one, several or all can be arranged in said vehicle according to known art.

According to another embodiment of the invention said control unit can be programmed also to simulate vehicle speed change with different possible gears engaged in said transmission and select the one gear that results in a smallest change of vehicle speed. The selected gear can be engaged in connection to said inactivation of said freewheeling at position D. Thus, a better gear selection will be performed for engine braking and/or auxiliary braking resulting in the right braking torque.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the above mentioned control unit programmed with the inventive functions. The data-processing unit 510 can comprise, for example, a microcomputer.

The memory 520 also has a second memory part 540, in which a program for controlling the freewheel function according to the invention is stored. In an alternative embodiment, the program for controlling the freewheel function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for controlling an automatic freewheeling function in a vehicle where a freewheeling function is active due to a prevailing freewheeling condition, comprising the:
    predicting that the vehicle soon will travel in a steep downhill slope that is steeper compared to a prevailing downhill slope,
    simulating if less fuel will be consumed if the freewheeling function is inactivated before the vehicle enters the steeper downhill slope compared to if the vehicle enters the steeper downhill slope with the freewheeling function active, and
    inactivating the freewheeling function before the vehicle enters the steeper downhill slope if the simulation shows that less fuel will be consumed.

2. Method as claimed in claim 1, comprising when inactivating the freewheeling function also starting to decrease vehicle speed before entering the steeper downhill slope.

3. Method as claimed in claim 2, the wherein inactivation of the freewheeling function comprises drivingly connecting a combustion engine to a transmission and driven wheels of the vehicle.

4. Method as claimed in claim 3, wherein the decrease of vehicle speed is performed by braking the vehicle with an engine braking device.

5. Method as claimed in claim 4, wherein the decrease of vehicle speed is performed by also braking the vehicle with auxiliary braking device.

6. Method as claimed in claim 4, wherein in the simulation also simulating vehicle speed change with different possible gears engaged in the transmission and selecting the one gear that results in a smallest change of vehicle speed.

7. Vehicle comprising an engine, an automated manual transmission, wheels driven by the engine, a freewheeling device and a control unit for controlling the engine, where the engine is arranged to drive the driven wheels via the automated manual transmission, and where the freewheeling device, the engine and the automated manual, transmission are controlled by a control unit, wherein the control unit is arranged to perform the method steps in claim 1.

8. A computer comprising a program for executing the method as claimed in claim 1.

9. A non-volatile computer program product comprising a program code stored on a computer-readable medium for executing the method as claimed in claim 1.

10. A non-volatile storage medium , such as a computer memory (520) or a nonvolatile data storage medium (550), for use in a computing environment, the memory comprising a computer readable program code to perform the method as claimed in claim 1.

* * * * *